United States Patent

[11] 3,575,014

[72] Inventor John Wright
 Catonsville, Md.
[21] Appl. No. 839,152
[22] Filed July 7, 1969
[45] Patented Apr. 13, 1971
[73] Assignee Koppers Company, Inc.

[54] TORSIONALLY AND AXIALLY FLEXIBLE COUPLING
10 Claims, 7 Drawing Figs.

[52] U.S. Cl. .................................................... 64/14
[51] Int. Cl. .................................................... F16d 3/64
[50] Field of Search .......................................... 64/14, 9

[56] References Cited
UNITED STATES PATENTS

| | | | |
|---|---|---|---|
| 2,849,871 | 9/1958 | Moeller ........................ | 64/14 |
| 3,094,853 | 6/1963 | Boschi ......................... | 64/14 |

Primary Examiner—Fred C. Mattern, Jr.
Assistant Examiner—Randall Heald
Attorneys—Boyce C. Dent, Oscar B. Brumback and Olin E. Williams

ABSTRACT: The flexible coupling includes an elongated sleeve with a plurality of radially extending elongated blades and a cylindrical elongated hub with a plurality of radially outwardly extending blades. The sleeve is coaxially positioned on the hub member with the sleeve inwardly extending blades alternately interleaved between the outwardly extending blades of the hub member. Elongate flexible members having metal plates bonded to their sidewalls are positioned between the interleaved blade members. Sleeve channel members are positioned around the axial ends of the sleeve blade members at one end of the hub in abutting relation with the adjacent ends of the metal plates secured to the flexible members. An annular plate member is secured to a flanged end portion of the sleeve to maintain the elastic members axially between the blades. Hub channel members are positioned around the axial ends of the hub blade members at the opposite end of the hub and also in abutting relation with the adjacent ends of the metal plates secured to the flexible members. With the above arrangement the sleeve channel members and hub channel members abut opposite sides of the flexible members at opposite ends thereof. A retaining ring is secured to the hub in abutting relation with the hub channel members and an end ring is secured to an opposite flanged portion of the sleeve member in abutting relation with a thrust ring which is secured to the retaining ring. The dimensions of the sleeve member, the hub member, the channel members and the flexible members with the metal plates secured thereto are such that an axial force exerted on the end ring preloads the flexible members axially. Substantial axial thrust can be imposed on the preloaded coupling without axial movement between the components of the coupling. Above a given predetermined axial thrust, axial movement between the components takes place. Torsional preloading of the flexible members is accomplished by wedging them into the spaces between the interleaved blades which are circumferentially smaller than the width of the flexible members in their free state.

Patented April 13, 1971
3,575,014
2 Sheets-Sheet 1
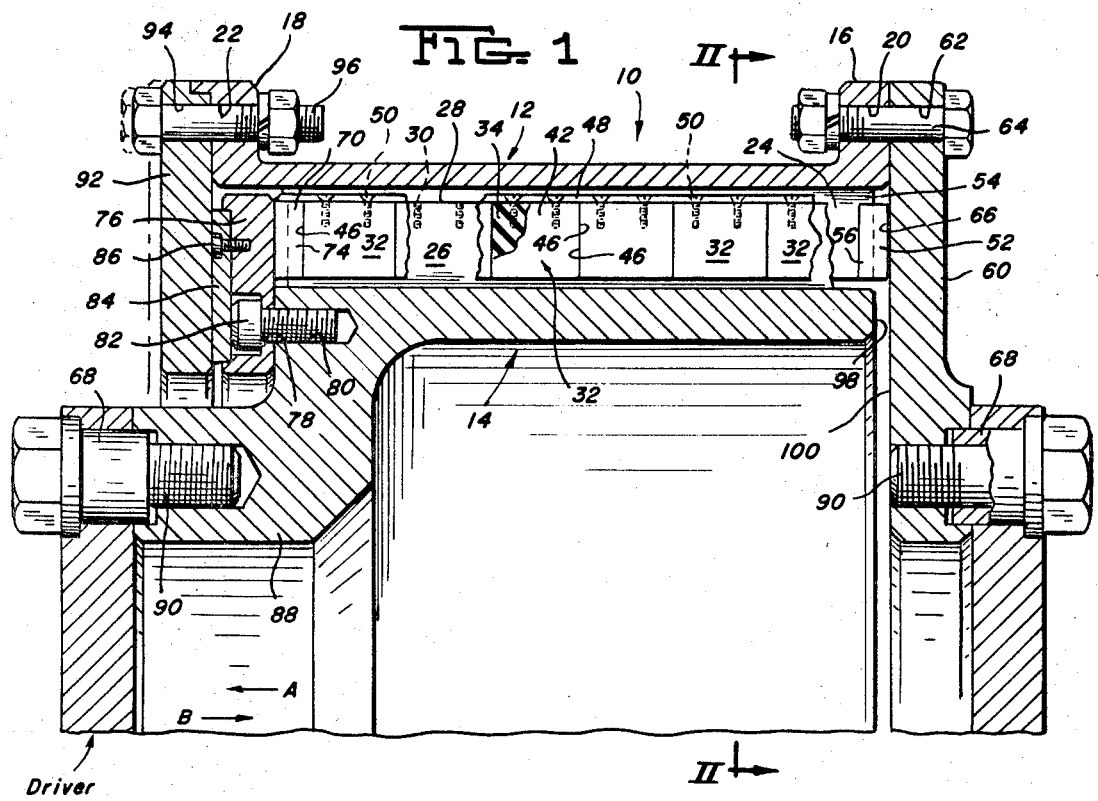
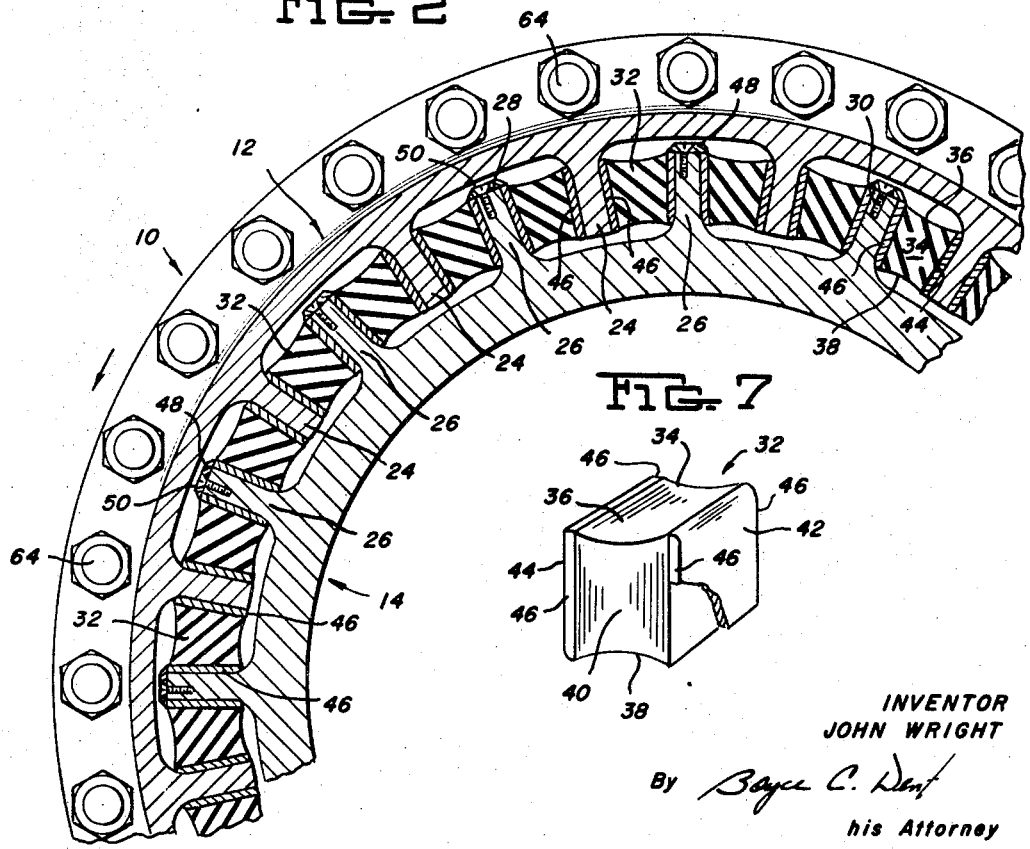
INVENTOR
JOHN WRIGHT
By Boyce C. Dent
his Attorney

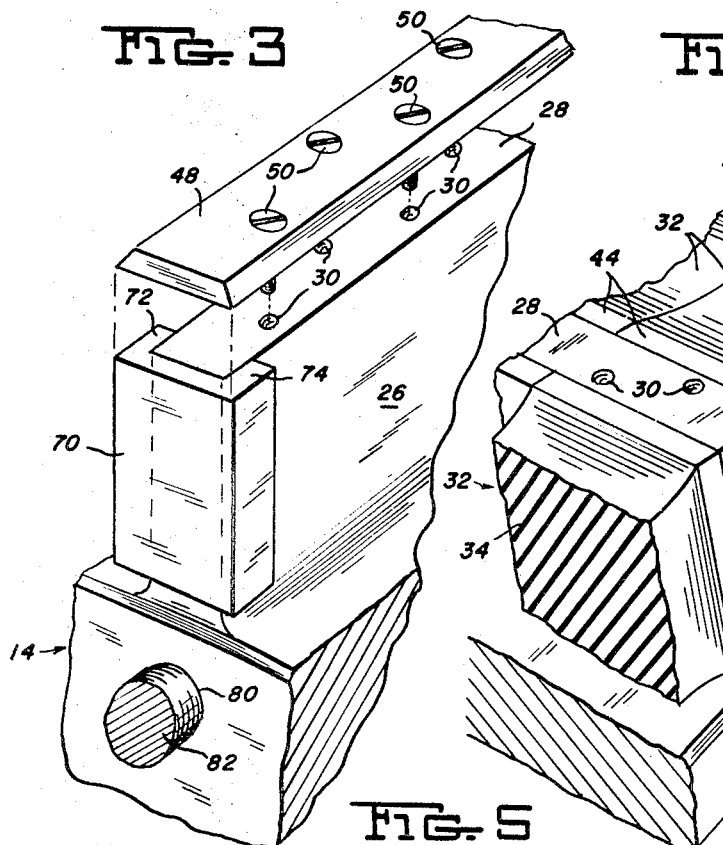

TORSIONALLY AND AXIALLY FLEXIBLE COUPLING

BACKGROUND OF THE INVENTION

1. Field of the Invention

This invention relates to a torsionally and axially flexible coupling and more particularly to an axially flexible coupling that withstands substantial axial thrust without axial displacement of the components.

2. Description of the Prior Art

Torsionally flexible couplings having interleaved blade members with flexible members therebetween are known and are disclosed in U.S. Pat. Nos. 2,621,493; 2,719,412; 2,764,003; and 2,873,590.

Although flexible couplings similar to those disclosed in the above patents provide desired torsional flexibility, because of the manner in which the resilient members are positioned between the blades, little, if any, control is provided for axial thrust. The depending flanges on the coaxial members either exert an axial compressive force on the flexible members when assembled or provide an enclosure for flexible members not under axial compression. With either arrangement the thrust loads imparted to the coupling result in axial displacement that is not only limited by the flange configuration but is indeterminate since the resilient members may either bind or slip in the axial direction within their enclosures. Therefore, the axial stiffness desired cannot be reliably determined.

SUMMARY OF THE INVENTION

The flexible coupling herein described exhibits controlled axial displacement of the components when subjected to axial thrust loads. Below a predetermined axial thrust, little, if any, axial displacement takes place between the coupling components. Above the predetermined axial thrust, displacement between the components takes place. This feature provides a coupling where low axial stiffness is obtained in the flexible members only at thrust values above predetermined values. The flexible coupling also has the desirable properties of a torsionally flexible coupling because of the circumferential preloading of the flexible members. The improved arrangement of the flexible members between the interleaved blades permits use of the coupling where limited component misalignment occurs.

Briefly, the invention includes a coaxial sleeve and hub member that have interleaved radially projecting blades. Flexible members having metal plates bonded to the sidewalls are positioned between the interleaved blade members. Means are provided to preload the flexible members axially upon assembly of the coupling to control the axial movement of the coupling components below and above preselected axial thrust loads. Torsional preloading of the flexible members is accomplished by making their circumferential width, in the free state, greater than the width of the spaces between the interleaved blades and wedging the members in the spaces.

Accordingly, the principal object of this invention is to provide a flexible coupling that does not exhibit axial movement of the components when an axial thrust load below a predetermined value is exerted thereon.

Another object of this invention is to provide a flexible coupling that is operable where limited coupling component misalignment occurs.

These and other objects and advantages of this invention will be more completely disclosed and described in the following specification, the accompanying drawings and the appended claims.

BRIEF DESCRIPTION OF THE DRAWINGS

FIG. 1 is a fragmentary sectional view in side elevation of the flexible coupling. A portion of the coupling before preloading is illustrated in chain-dotted outline form.

FIG. 2 is a view in section taken along the line II-II in FIG. 1 illustrating the arrangement of the flexible members between the interleaved blades.

FIG. 3 is a fragmentary perspective view of the block-locating channel positioned on the end portion of the hub blade.

FIG. 4 is a fragmentary perspective view of the flexible members in a preloaded condition.

FIG. 5 is a diagrammatic developed plan view in section illustrating schematically the relative position of a sleeve blade and hub blades with the flexible members therebetween after the coupling is preloaded.

FIG. 6 is a view similar to FIG. 5 illustrating the coupling when an axial thrust is applied to the hub member that is greater than the applied preload axial thrust.

FIG. 7 is a perspective view of one of the flexible elements, a series of which are positioned between the blades of the sleeve and hub member.

DESCRIPTION OF THE PREFERRED EMBODIMENT

Referring to the drawings and particularly FIGS. 1 and 2, there is illustrated a flexible coupling generally designated by the numeral 10 that has a sleeve member 12 axially positioned on a tubular hub member generally designated by the numeral 14. The sleeve member 12 has a pair of end flanges 16 and 18 each with a plurality of bolt apertures 20 and 22 therethrough. The sleeve member has a plurality of radially inwardly extending blade members 24 that extend around the inner periphery of the sleeve 12. The hub member 14 has a plurality of radially outwardly extending blade members 26 that have a planar upper surface 28 with a plurality of threaded bores 30 extending into the blade members 26. The sleeve member 12 has coaxially positioned on the hub member 14 with the radially inwardly extending sleeve blades 24 interleaved between the radially outwardly extending hub blades, as illustrated in FIG. 2. Spaces are provided between the sidewalls of the respective blade members 24 and 26 for a series of flexible elements generally designated by the numeral 32 and illustrated in FIG. 7. Each flexible element 32 has a body portion 34 of flexible material such as natural or synthetic rubber or other polymeric material that exhibits the flexible properties of rubber. The durometer hardness of the flexible material is dependent upon the axial and torsional loads to which the coupling 10 is subjected and the degree of deflection desired. The body portion 34 preferably has a concave upper surface 36 and a concave lower surface 38 with concave front and rear walls 40. Metal plates 42 and 44 are rigidly bonded to the sidewalls of the body portion 34 and have planar front and rear edges 46. Although the flexible elements 32 are illustrated as substantially rectangular in configuration in a relaxed, unloaded condition, it should be understood that the flexible elements 32 may also have other configurations such as a trapezoidal configuration in top plan in an unloaded condition that would distort to a rectangular configuration under preload or distort to a less acute trapezoidal configuration. While the upper and lower surfaces 36 and 38 and the front and rear walls 40 have been illustrated as being concave, they may be planar in the free state so that upon preloading, these surfaces will bulge outwardly. As viewed in FIG. 5, the chain-dotted lines indicate the configuration of the body portion 34 prior to preloading. The space 47 existing between the elements 32 when the surfaces 40 are concave provides a space into which the flexible material can be deformed upon axial and torsional preloading.

As illustrated in FIG. 1, a series, i.e. six flexible elements are positioned in aligned relation with the edges 46 of metal plates 42 and 44 abutting each other. A retaining plate 48 is positioned in overlying relation with the upper surface 28 of each of the hub blades 26 and screws 50 secure the retaining plates 48 to the hub blade surface 28. The retaining plates 48 have a transverse dimension so that the plate edges overlap the metal plates 42 and 44 of adjacent elements 32 to retain the flexible elements 32 in position between interleaved blades 24 and 26. If desired, the retaining plates 48 may be made as an integral part of the hub blades 26. Although the use of a series of flexible elements is preferred to provide spaces 47 as previously explained, it is possible to use only one long continuous flexible element which would, of course, have correspondingly longer plates 42 and 44 bonded thereto.

Channel-shaped flexible element-retaining members 52 are positioned around the ends 54 of the sleeve member 12 adjacent the flanged end portion 16. The channel members 52 have inwardly extending flanges 56 and 58 that abut the edges 46 of the flexible elements 32 on opposite sides of the sleeve blade 24. The width of the flanges 56 is substantially the same as the width of the metal plates 42 and 44 bonded to the body of flexible material 34. An adapter plate 60 has a plurality of peripheral apertures 62 that are aligned with the apertures 20 in sleeve flange 16. Bolts 64 extend through the aligned apertures 62 and 20 to secure the plate 60 to the sleeve flange 16. The plate 60 has an inner annular surface 66 that abuts the external surface of the channel-shaped retaining members 52 to retain the flexible elements axially within the space between the interleaved blades 24 and 26. The adapter plate 60 has suitable connecting portions 68 for connecting the coupling 10 to a drive or driven member.

Other channel-shape retaining members 70 are positioned around the end of the hub blades 26 adjacent the sleeve flange 18 which is opposite the end of the coupling 10 where the channel members 52 are positioned on the sleeve blade end portions. The channel members 70 have inwardly extending flange portions 72 and 74 that abut the adjacent edges 46 of plates 42 and 44 on opposite sides of the hub blade 26. An annular retaining ring 76 is positioned in overlying relation with the rear surface of channels 70 and have a plurality of bores 78 therethrough which are aligned with bores 80 in the hub member 14. Capscrews 82 secure the retaining plate 76 to the hub member 14 and maintain the flexible elements 32 between the blade members 24 and 26. An annular thrust plate 84 is secured to the outer surface of the retaining ring 76 by means of screws 86. The hub member 14 has an inner axial end portion 88 with suitable connecting means 90 to which a drive or driven member may be connected. An annular ring member 92 is positioned in overlying relation with the thrust plate 84 and has a plurality of peripheral apertures 94 which are aligned with the bolt apertures 22 of sleeve flange 18. Bolts 96 extend through the aligned apertures 22 and 94 and are tightened to exert a force on one side of the flexible elements 32 positioned between the interleaved blades 24 and 26. The thrust plate 84 is preferably made from a material having dry lubricating properties such as oil-impregnated brass, thereby providing a low-friction rubbing surface between the thrust plate 84 and ring member 92. Nonmetallic materials of suitable strength having dry lubricating properties may also be used to make thrust plates 84. A low-friction rubbing surface is desirable since relative motion occurs between the thrust plate and ring member 92 when the flexible elements 32 are further deformed upon rotation of the coupling.

Referring to FIG. 1 the chain-dotted outline illustrates the relative position of the ring member 92 when the flexible elements 32 are positioned between the blades 24 and 26 and are in an unloaded condition. Upon moving the end ring 92 toward the sleeve flange 18 by tightening the bolts 96, a force is exerted through the channel-shaped retaining members 70 onto the metal plates 42 and 44 of flexible elements 32 located on opposite sides of the hub blades 26. It should be noted the same metal plates on which the force is exerted by the channel-shaped retaining member 70 on the opposite end of the coupling 10 are not restrained by the channel-shaped retaining members 52 so that the series of aligned metal plates 42 and 44 are free to move relative to the other metal plates bonded on the opposite side of the flexible body portion 34. As illustrated in FIG. 4 the preload condition of the flexible elements 32 is illustrated. The channel-shaped retaining member 52 maintains the plates 42 of the series of flexible elements 32 in fixed position relative to the inwardly extending blade 24. The thrust exerted by tightening the ring 92 and moving the ring 92 axially toward the sleeve flange 18 distorts the flexible body portion 34 of the flexible elements 32 and moves the series of abutting plates 44 on the flexible elements 32 as illustrated in FIG. 4. In this position, a thrust is exerted by the flexible elements 32 in a direction indicated by the arrow in FIG. 1 and designated by the letter A. If desired, the ring 60 may be used instead of ring 92 to accomplish preloading since the same effect is achieved.

The flexible elements 32 are thus under a preload condition when in the position illustrated in full lines in FIG. 1 and the flexible elements 32 are distorted as illustrated in FIGS. 4 and 5. When an axial thrust is applied to the coupling 10 in the direction of the arrow designated by the letter B, the applied axial thrust is opposed by the preload within the flexible coupling 10. There is relatively little, if any, movement between the sleeve 12 and hub member 14 when axial thrust loads below the preloading forces of the coupling are applied in the direction indicated by the arrow B. When the axial-applied thrust load exceeds the preload thrust, the flexible elements 32 are distorted to the shape illustrated in FIG. 6 and this applied axial thrust moves the hub member axially in the direction of the applied thrust toward the adapter plate 60. The hub end portion 98 is spaced from the inner surface 100 of the adapter plate 60 under axial preload a preselected distance and the hub 14 is movable relative to the sleeve 12 the distance between the hub and adapter plate 60.

Although the flexible coupling 10 has been described in conjunction with a flexible coupling having controlled axial movement of the hub relative to the sleeve below the preload of the flexible elements 32, it should be understood that the above-described flexible coupling 10 provides torsional flexibility both in a highly preloaded condition as above described and in a slightly preloaded condition where the axial movement of the components is not limited. It is desirable where the flexible coupling 10 is utilized principally for torsional flexibility that a slight preload be exerted on the flexible elements 32 to maintain the flexible elements in position between the interleaved blades 24 and 26. The concave surfaces 34, 38 and 40 of the flexible element 32 are provided in the body portion of flexible material 34 to permit vertical distortion of the flexible elements 32 when the coupling 10 is subjected to axial and torsional forces, both from preloading and operation.

The above-described coupling has two principal applications. There is provided an axially flexible coupling having determinate axial stiffness, which by means of axial preloading exhibits these axial stiffness properties over a predetermined range of axial thrust, at the same time providing determinate torsional flexibility over the full range of torque to which it is subjected. There is provided a torsionally flexible coupling which is capable of axial preloading so that the relative axial position of driving and driven members remains the same over the full, or over part of the range of axial thrust loads, at the same time providing determinate torsional flexibility over the full range of torque to which it is subjected. The first application has utility as a coupling in the line shafting of a marine-propulsion drive, which has to operate under propeller thrust loading and where additional axial flexibility is desired to reduce axial vibration. The second application has utility in a marine-propulsion drive where the coupling has to operate under propeller thrust and where additional torsional flexibility is required. The coupling can provide this torsional flexibility with or without axial deflection due to thrust, by means of its axial preloading capability, and can safely transmit full axial propeller thrust.

According to the provisions of the patent statutes, I have explained the principle, preferred construction and mode of operation of my invention and have illustrated and described what I now consider to represent its best embodiment.

I claim:

1. In a flexible coupling having a driving element and a driven element, the combination comprising:
   said driving element having spaced projecting blades with opposite end portions;
   said driven element having spaced projecting blades with opposite end portions;

said blades on said driven element projecting alternately between the blades on said driving element forming an interleaved relation therebetween;

flexible elements positioned between said interleaved projecting blades and having sidewalls and end walls, said sidewalls abutting the adjacent sidewalls of said interleaved projecting blades and forming a flexible connection between said interleaved projecting blades; and retaining means abutting certain of said blade end walls and said flexible member end portions to maintain said flexible elements between said interleaved blades and distort said flexible elements axially to maintain an axial thrust on said flexible elements.

2. A flexible coupling as set forth in claim 1 which includes second retaining means secured to the top surface of certain of said projecting blades on one of said elements in overlying relation with portions of said flexible elements on opposite sides of said projecting blades to maintain said flexible elements between said interleaved blades.

3. A flexible coupling as set forth in claim 2 which includes rigid sidewalls on both sides of said flexible elements, said rigid sidewalls abutting the adjacent sidewalls of said projecting blades so that each of said projecting blades abuts a pair of rigid sidewalls of said flexible elements on opposite sides thereof.

4. A flexible coupling as set forth in claim 1 in which said flexible elements have concave bottom, top and end walls.

5. A flexible coupling comprising:
a hub member having blades projecting radially outwardly therefrom;
a sleeve member having spaced blades projecting radially inwardly therefrom;
said sleeve member positioned coaxially on said hub member with said inwardly projecting blades positioned alternately between said hub member outwardly projecting blades and forming an interleaved relation therebetween;
flexible elements positioned between said interleaved projecting blades, said flexible elements having rigid sidewalls abutting the adjacent sidewalls of said interleaved projecting blades;
first retaining means abutting said flexible element rigid sidewalls on opposite sides of said hub member blades adjacent one end of said sleeve member;
second retaining means abutting said flexible element rigid sidewalls on opposite sides of said sleeve member blades adjacent the other end of said sleeve member; and
thrust means exerting an axial thrust on said retaining means and distorting said flexible element and provide a preload axial thrust on said flexible elements.

6. A flexible coupling as set forth in claim 5 which includes:
radially extending spaced flange members on said sleeve member;
a first annular plate member secured to one of said flange members and abutting one of said retaining means;
a second annular plate member secured to the other of said flange members;
means positioned between said second annular plate member and said other retaining means; and
means to move said annular plates toward each other to thereby distort said flexible elements and provide a preload axial thrust on said flexible elements.

7. A flexible coupling as set forth in claim 5 which includes:
radial end walls on said hub member projecting blades;
retainer plates secured to said radial end walls and having portions abutting said flexible element rigid sidewalls to maintain said flexible element between said interleaved blades.

8. A flexible coupling as set forth in claim 5 in which said first retaining means includes channel-shaped members positioned around the end portion of said hub member blades adjacent one end of said sleeve member in abutting relation with said flexible element rigid sidewalls on opposite sides of said hub member blades.

9. A flexible coupling as set forth in claim 8 in which said second retaining means includes channel-shaped members positioned around the end portion of said sleeve member blades adjacent the other end of said sleeve member in abutting relation with said flexible element rigid sidewalls on opposite sides of said sleeve member blades.

10. A flexible coupling as set forth in claim 5 which includes:
radially extending spaced flange members on said sleeve member;
said first retaining means including channel-shaped members positioned around the end portion of said hub member blades adjacent one end of said sleeve member in abutting relation with said flexible member rigid sidewalls on opposite sides of said hub member blades;
an annular thrust plate positioned in abutting relation with said channel-shaped members;
a first annular plate member secured to one of said flange members and abutting said annular thrust plate;
second channel-shaped members positioned around the end portion of said sleeve member blades adjacent the other end of said sleeve member in abutting relation with said flexible element rigid sidewalls on opposite sides of said sleeve member blades;
a second annular plate member secured to the other of said sleeve flange members and abutting said other channel-shaped members; and
means to move said first and second annular plate members toward each other to thereby distort said flexible elements and provide a preload axial thrust on said flexible elements.